(12) United States Patent
Kim et al.

(10) Patent No.: US 9,134,461 B2
(45) Date of Patent: Sep. 15, 2015

(54) EDGING PROCESS OF LENS USING TRANSPARENT COATING LAYER FOR PROTECTING LENS

(75) Inventors: Hun Rae Kim, Daejeon (KR); Jeong Ki Kang, Daejeon (KR); Ja Heung Koo, Daejeon (KR); Sun Do Lee, Daejeon (KR)

(73) Assignee: Essilor International (Compagnie Generale d'Optique), Charenton-le-Pont (FR)

( * ) Notice: Subject to any disclaimer, the term of this patent is extended or adjusted under 35 U.S.C. 154(b) by 1580 days.

(21) Appl. No.: 12/092,697

(22) PCT Filed: Mar. 27, 2007

(86) PCT No.: PCT/KR2007/001491
§ 371 (c)(1),
(2), (4) Date: Jul. 17, 2008

(87) PCT Pub. No.: WO2007/111465
PCT Pub. Date: Oct. 4, 2007

(65) Prior Publication Data
US 2008/0292787 A1    Nov. 27, 2008

(30) Foreign Application Priority Data

Mar. 27, 2006  (KR) .................. 10-2006-0027609
Jul. 13, 2006   (KR) .................. 10-2006-0065727

(51) Int. Cl.
*B05D 5/06* (2006.01)
*G02B 1/11* (2015.01)
*G02B 1/10* (2015.01)
*B24B 9/14* (2006.01)
*B24B 13/005* (2006.01)
*C09D 127/12* (2006.01)
*C08K 5/54* (2006.01)

(52) U.S. Cl.
CPC ............... *G02B 1/105* (2013.01); *B24B 9/146* (2013.01); *B24B 13/005* (2013.01); *C09D 127/12* (2013.01); *C08K 5/5406* (2013.01)

(58) Field of Classification Search
USPC .......... 427/154, 155, 162, 164; 351/166, 177, 351/178
IPC .......... B24B 9/146,13/005; G02B 1/105; C08K 5/5406; C09D 127/12
See application file for complete search history.

(56) References Cited

U.S. PATENT DOCUMENTS

| | | | |
|---|---|---|---|
| 3,136,745 A | 6/1964 | Albin et al. | 526/247 |
| 4,418,186 A | 11/1983 | Yamabe et al. | 526/247 |
| 4,591,616 A | 5/1986 | Miyata et al. | 525/185 |
| 4,758,618 A | 7/1988 | Ito et al. | 524/430 |
| 6,294,627 B1 | 9/2001 | Worm et al. | 526/247 |
| 7,449,233 B2 | 11/2008 | Arora | 428/112 |
| 7,635,523 B2 | 12/2009 | Goetz et al. | 428/447 |
| 2003/0049370 A1 | 3/2003 | Lacan et al. | 724/165 |
| 2005/0168685 A1 | 8/2005 | Katagiri et al. | 351/159 |
| 2006/0244910 A1 | 11/2006 | Nam et al. | 351/166 |
| 2007/0141358 A1* | 6/2007 | Jallouli et al. | 428/426 |

FOREIGN PATENT DOCUMENTS

| | | |
|---|---|---|
| EP | 933377 | 8/1999 |
| JP | 2004-061866 | 2/2004 |
| JP | 2004/122238 | 4/2004 |
| JP | 2004/15747 | 6/2004 |
| JP | 2004-226942 | 8/2004 |
| KR | 10-0517748 | * 2/2005 |
| WO | WO 03/057641 | 7/2003 |
| WO | WO 2004/110946 | 12/2004 |
| WO | WO 2008/053020 | 5/2008 |

OTHER PUBLICATIONS

International Search Report, issued in International Application No. PCT/KR2007/001491, dated Jul. 5, 2007.

* cited by examiner

*Primary Examiner* — Mathieu Vargot
(74) *Attorney, Agent, or Firm* — Norton Rose Fulbright US LLP

(57) ABSTRACT

The present invention relates to a process of edging a lens comprising forming a lens-protective transparent coating layer on the surface of the lens. When the lens coated with a transparent coating layer comprising a fluorine-containing elastomer and optionally a fluorine-containing organosilane compound and having a surface energy of less than 15 mJ/m$^2$ is edged, the scratch of lens during handling, the damage of lens caused by chemical contaminants, and lens off-centring phenomena can be prevented. Further, such an edging process requires no adhesive tape, making the process simple, and prevents the contamination of the lens surface. Further, the inventive transparent coating layer makes it possible to measure the diopter of lens exactly owing to its transparency and it is manually removable without a chemical.

24 Claims, No Drawings

# EDGING PROCESS OF LENS USING TRANSPARENT COATING LAYER FOR PROTECTING LENS

This application is a national phase application under 35 U.S.C. §371 of International Application No. PCT/KR2007/001491 filed 27 Mar. 2007, which claims priority to Korean Patent Application No. 10-2006-0027609 filed 27 Mar. 2006 and Korean Patent Application No. 10-2006-0065727 filed 13 Jul. 2006. The entire text of each of the above-referenced disclosures is specifically incorporated herein by reference without disclaimer.

FIELD OF THE INVENTION

The present invention relates to a process for edging a lens using a lens-protective transparent coating layer having a low surface energy.

BACKGROUND OF THE INVENTION

In general, optical lenses or optical parts have various functional coating layers on the surface thereof. For example, a high, medium or low refractive inorganic oxide such as $SiO_2$, $ZrO_2$, $Al_2O_3$ and $TiO_2$ may be multi-coated on the surface of an optical lens or parts to form an anti-reflective layer, reducing the light reflectance, or a layer capable of selectively absorbing/reflecting light having certain wavelength may be formed to impart various optical properties to the optical lens or parts. Further, indium tin oxide (ITO) may be deposited so as to provide a transparent conductivity or electronic wave shielding property to the optical lens or parts. Recently, such an optical design has been also used as a means for coloring an article under a vacuum condition.

However, the deposition of an inorganic oxide on a lens under a vacuum condition has a disadvantage in that the lens is easily contaminated by various contaminants such as chemicals and brine which are difficult to remove. Further, there is the problem that the contaminants incorporated into the inside of the inorganic oxide layer may change the designed optical properties of the lens.

To solve the above problems, a method of coating a fluorine-containing organosilane on a lens under a vacuum condition has been developed, and Japanese Patent Application Publication No. 2004-226942 suggested the use of a fluorine-containing oil together with a fluorine-containing organosilane to strengthen the water- and oil-repellant properties.

However, the lens coated with such a fluorine-containing or perfluoropolyether-containing organosilane compound has a low surface energy and a low surface friction coefficient, and accordingly, it does not easily adhere to other substances. Particularly, when the fluorine- or perfluoropolyether-containing organosilane compound is coated on an inorganic oxide layer, the organosilane compound reacts with the inorganic oxide to produce a fluorine-containing film having a high strength and a low surface frictional coefficient.

In order to edge a lens having such a high strength film on its surface, the lens is required to be fixed, e.g., by using an adhesive tape, and even if such an adhesive is used, off-centring of the lens may occur during the edging procedure.

Japanese Patent Application Publication No. 2004-122238 discloses the use of a protective film made of vinyl acetate on the surface of a water- or oil-repellent lens to ameliorate the lens off-centring problem that occurs during edging. But this method still requires the use of an adhesive tape or pad for elaborate edging, and suffers from low chemical resistance of the protective film.

In order to prevent the lens off-centring phenomena, WO 02/92524, WO 03/057641 and WO 04/110946 have suggested a method of depositing a metal fluoride under a vacuum condition and optionally an organic layer for increasing the surface energy on the surface of a water-repellent lens. However, this method has disadvantages in that a further chemical treatment step for removing the deposited metal fluoride layer is required; the rate of deposition and the thickness of the deposited metal fluoride layer cannot be easily controlled, and defective lenses cannot be checked in advance because the metal fluoride deposition is carried out immediately after the deposition of an anti-reflective layer.

SUMMARY OF THE INVENTION

Accordingly, it is an object of the present invention to provide an improved process of edging a lens using a temporary lens-protective layer having a good resistance against rotational torque and a high affinity to a water-repellent surface, which does not generate lens off-centring phenomena even when a separate adhesive tape is not used and can be easily removed in a simple manner.

In accordance with one aspect of the present invention, there is provided a process of edging a lens comprising forming a lens-protective transparent coating layer on the surface of the lens, edging the coated lens, and removing the transparent coating layer from the edged lens, wherein the transparent coating layer has a surface energy of less than 15 $mJ/m^2$.

DETAILED DESCRIPTION OF THE INVENTION

The lens-protective transparent coating layer according to the present invention is characterized by having a surface energy of less than 15 $mJ/m^2$ and comprises a fluorine-containing elastomer.

Preferably, the surface energy of the transparent coating layer ranges from 11 to 14 $mJ/m^2$.

The fluorine-containing elastomer used in the present invention has a high stickiness and simultaneously a high elasticity, and thus, when it is coated on the surface of a lens, it imparts to the lens a good resistance against rotational torque and a good adhesion to the lens, facilitating the lens edging process without using an adhesive tape, and at the same time preventing the contamination of the lens caused by contaminants or chemicals during handling while protecting the lens from damage caused by lens flakes generated during the edging procedure.

The transparent coating layer comprising the fluorine-containing elastomer provides the advantages that it can be easily removed simply by hands, without using a chemical, after the completion of the edging process, and it makes possible to determine the exact diopter of lens owing to its high transparency.

The fluorine-containing elastomer may be prepared by homopolymerizing or copolymerizing at least one monomer selected from the group consisting of chlorotrifluoroethylene, hexafluoropropylene, hexafluoroacetone, 1-hydropentafluoropropylene, perfluorovinyl ether, perfluoromethylvinyl ether, trifluoroethylene, tetrafluoroethylene, and vinylidene fluoride. For the copolymerization, at least one comonomer selected from ethylene and propylene may be used.

The fluorine-containing elastomer may be prepared by the methods disclosed in U.S. Pat. Nos. 4,758,618; 4,591,616; 3,136,745; 6,294,627; and 4,418,186, and representative examples of commercially available fluorine-containing elastomer include DAIEL™ (Daikin), DYNEON™ (3M), TECNOFLON™ (Solvay Solexis), VITON™ (DuPont) and AFLAS™ (Asahi Glass).

In addition to the fluorine-containing elastomer, the transparent coating layer according to the present invention may further comprise a fluorine-containing organosilane compound in order to enhance the strength of the coating layer.

The fluorine-containing organosilane compound used with the fluorine-containing elastomer functions to impart a low surface energy to the transparent coating layer, thus preventing the attachment of contaminants, and it provides good chemical and scratch resistances.

Representative examples of the fluorine-containing organosilane compound include an organosilane compound having fluorine-substituted alkyl groups represented by any one of formulas (1) to (4), and an organosilane compound having a perfluoropolyether group represented by formula (5), not limited thereto.

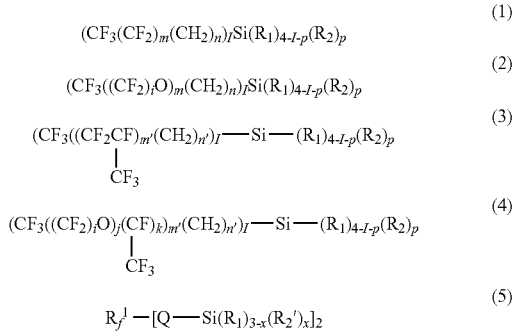

$$(CF_3(CF_2)_m(CH_2)_n)_i Si(R_1)_{4-I-p}(R_2)_p \quad (1)$$

$$(CF_3((CF_2)_iO)_m(CH_2)_n)_i Si(R_1)_{4-I-p}(R_2)_p \quad (2)$$

$$(CF_3((CF_2CF)_{m'}(CH_2)_{n'})_I \!-\! Si \!-\! (R_1)_{4-I-p}(R_2)_p \quad (3)$$
$$\mid$$
$$CF_3$$

$$(CF_3((CF_2)_iO)_j(CF)_k)_{m'}(CH_2)_{n'})_I \!-\! Si \!-\! (R_1)_{4-I-p}(R_2)_p \quad (4)$$
$$\mid$$
$$CF_3$$

$$R_f^1 \!-\! [Q \!-\! Si(R_1)_{3-x}(R_2')_x]_2 \quad (5)$$

wherein,
$R_1$ is a hydrolyzable group;
$R_2$ is hydrogen or $C_{1-4}$ alkyl;
$R_2'$ is $C_{1-4}$ alkyl;
$R_f^1$ is a monovalent or divalent polyfluoropolyether group;
Q is an organic divalent bridging group;
i, j, k, m and n are each independently an integer in the range of 0 to 13;
m' is an integer in the range of 1 to 13;
n' is an integer in the range of 0 to 3;
p is an integer in the range of 0 to 3;
I is 1 or 2; and
x is 0 or 1.

The hydrolyzable group $R_1$ may be halogen, $C_{1-4}$ alkoxy, acyloxy, acyl and polyoxyalkylene such as polyoxyethylene (see U.S. Pat. No. 5,274,159). Specific examples of the hydrolyzable group $R_1$ are methoxy, ethoxy, propoxy, chlorine and acetoxy.

In one embodiment of the present invention, $R_f^1$ is stable and inert, preferably saturated nonpolar fluoroaliphatic group. The fluoroaliphatic group may be a straight, branched or cyclic group, or a combination thereof, and it may contain at least one heterogeneous atom such as oxygen, 2- or 6-valent sulfur, or nitrogen. Preferably, the fluoroaliphatic group may be completely fluorinated, although it may contain at most one hydrogen or chlorine substituent in every two carbon atoms. Suitable fluoroaliphatic group may contain 3 to 18 carbon atoms, preferably 3 to 14 carbon atoms, and more preferably 4 to 10 carbon atoms, and preferably about 40 to about 80% by weight, and more preferably about 50 to about 79% by weight of fluorine atoms. Preferably, the end part of the fluoroaliphatic group may be a perfluorinated group having at least 7 fluorine atoms, e.g., $CF_3CF_2CF_2$—, $(CF_3)_2CF$—, and $F_5SCF_2$—. The preferred fluoroaliphatic group is completely or substantially fluorinated, and may include a perfluorinated aliphatic radical represented by $C_qF_{2q+1}$— where q is in the range of 3 to 18, preferably 4 to 10.

In a preferred embodiment of the present invention, $R_f^1$ is a divalent polyfluoropolyether group. The polyfluoropolyether group may be a straight, branched or cyclic group, or a combination thereof, and it may be saturated or unsaturated, and preferably perfluorinated wherein all of C—H bonds are substituted with C—F bonds. More preferably, the polyfluoropolyether group may include a perfluorinated repeating unit selected from the group consisting of —$(C_qF_{2q})$—, —$(C_qF_{2q}O)$—, —$(CF(Z))$—, —$(CF(Z)O)$—, —$(CF(Z)C_qF_{2q}O)$—, —$(C_qF_{2q}CF(Z)O)$— and —$(CF_2CF(Z)O)$— (where q is in the range of 3 to 18, preferably 4 to 10, and Z is a straight, branched or cyclic group, preferably an optionally oxygen-substituted perfluoroalkyl or perfluoroalkoxy group having about 1 to about 9 carbon atoms and 0 to about 4 oxygen atoms), and a combination thereof. Representative examples of the polyfluoropolyether group having the polymeric moiety of the perfluorinated repeating unit are disclosed in U.S. Pat. No. 5,306,758, which is incorporated herein as a reference.

The divalent polyfluoropolyether group has preferably an average structure of —$CF_2O(CF_2O)_r(C_2F_4O)_sCF_2$— (wherein r and s are in the range of 0 to 50 in average, provided that both r and s are not 0), —$CF(CF_3)O(CF(CF_3)CF_2O)_rCF(CF_3)$—, —$CF_2O(C_2F_4O)_tCF_2$— and $(CF_2)_3O(C_4F_8O)_t(CF_2)_3$— (wherein t is in the range of 3 to 50 in average). Among them, —$CF_2O(CF_2O)_r(C_2F_4O)_rCF_2$—, —$CF(CF_3)O(CF(CF_3)CF_2O)_rCF(CF_3)$— and —$CF_2O(C_2F_4O)_tCF_2$— are more preferred.

The divalent bridging group Q may be saturated or unsaturated straight, branched or cyclic group. Q may comprise a heterogeneous atom such as oxygen, nitrogen or sulphur, or a functional group such as carbonyl, amido, urethanylene or sulfonamindo. Preferably, the divalent bridging group Q may be a non-fluorinated organic group, e.g., hydrocarbon, preferably a straight chain hydrocarbon, optionally comprising a heterogeneous atom or functional group, preferably at least one functional group. Representative examples of Q include —C(O)NH(CH$_2$)$_3$—, —CH$_2$—O—(CH$_2$)$_3$—, CH$_2$OC(O)N(R)(CH$_2$)$_3$— (wherein, R is H or a lower alkyl) and —(CaH$_{2a}$)— (wherein, a is in the range of about 2 to about 6), preferably —C(O)NH(CH$_2$)$_3$—.

The fluorine-containing organosilane compound suitable for the present invention typically has a number average molecular weight of greater than about 200, preferably from about 1,000 to 10,000.

Preferred are fluorinated polyethersilane compounds represented by $XCF_2O(CF_2O)_f(C_2F_4O)_gCF_2X$, $XCF(CF_3)O(CF(CF_3)CF_2O)_gCF(CF_3)X$, $XCF_2O(C_2F_4O)_gCF_2X$ and $X(CF_2)_3O(C_4F_8O)_g(CF_2)_3X$, wherein —X is -Q-SiY$_{3-x}$R$^1{}_x$, Q is an organic divalent bridging group, Y is a hydrolyzable group, $R^1$ is a $C_{1-4}$ alkyl group, and x is 0 or 1. Preferably, in the fluorinated polyethersilane compound, Q comprises nitrogen atom. More preferably, in the compound, at least one X per molecule is C(O)NH(CH$_2$)$_3$Si(OR)$_3$ wherein R is methyl, ethyl, polyethyleneoxy or a combination thereof. In each compound, f and g may have various values, preferably f is between about 1 and about 50 and g is between about 4 and about 40.

The lens-protective transparent coating layer according to the present invention may be formed by applying a composition for forming the transparent coating layer to the surface of the lens and drying the applied composition. The composition for forming the transparent coating layer may be obtained by dissolving a fluorine-containing elastomer in a solvent to a concentration of 1 to 70% by weight, preferably 10 to 40% by weight of a solid content. When the concentration of the elastomer is less than 1% by weight, the transparent coating layer obtained has insufficient stickiness and elasticity, and when the concentration of the elastomer exceeds 70% by weight, the composition is unevenly coated.

Further, the transparent coating layer forming composition may comprise the above-mentioned fluorine-containing organosilane compound in an amount of 0.001 to 70% by weight, preferably 0.001 to 30% by weight based on the elastomer.

The solvent used in the composition may be preferably at least one selected from the group consisting of water, perfluorohexane, perfluoroheptane, perfluorononane, perfluoromethylpentane, perfluorocyclohexane, perfluorodimethylcyclohexane, perfluorotoluene, hexafluoropropene oxide, trifluoroacetic anhydride, ethyl trifluoroacetate, octafluoropentanol, 2,2-bistrifluoromethylpropanol, pentafluoropropanol, hexadecafluorononanol, perfluoro-2-butanol, isopropyl alcohol, butanol, ethylene glycol, diacetone alcohol, 2-ethoxyethanol, 2-methoxyethanol, 2-butoxyethanol, hexane, heptane, cyclohexane, acetylacetone, dimethylketone, methylethylketone, methylisobutylketone, toluene, benzene, and xylene, not limited hereto.

The transparent coating layer forming composition may comprise a conventional additive well known in the art, such as surfactants and dyes, in amount not affecting the effect of the invention.

The present invention comprises the lens coated with the transparent coating layer forming composition as a temporary protective layer within the scope thereof. The lens to which the transparent coating layer applied may be any one which can be processed by an edging process, and its representative examples may include glasses or camera lenses.

The transparent coating layer-forming composition according to the present invention may be coated on the most outer layer of at least one functional layers formed on a lens, e.g., an inorganic oxide layer (anti-reflective layer), water-repellant layer and/or oil-repellant layer, preferably on water-repellant and/or oil-repellant layer.

The inorganic oxide layer as the anti-reflective layer may be at least one vacuum-deposited ceramic layer known in the art, and its representative examples may include $SiO_2$, $ZrO_2$, $Al_2O_3$, and $TiO_2$.

The water-repellant layer or oil-repellant layer to be formed on the surface of the inorganic oxide layer may comprise a fluorine- or perfluoropolyether-containing organosilane compound, and it has hydrophobic or oleophobic characteristics, respectively, which can reduce the surface energy of the glass. The fluorine- or perfluoropolyether-containing organosilane compound is well known in the art, e.g., Japanese Patent Application Publication Nos. 1986-130902, 1983-172246, 1983-122979, 1983-172242, 1985-40254, 1985-6615, 1985-221470, 1987-148902, 1997-157582, 1997-202648 and 1997-263728, not limited hereto.

In the present invention, the transparent coating layer-forming composition may be applied in a suitable known method selected from a dip-coating, spray-coating, spin-coating, flow-coating, and roll-coating method, preferably a dip coating method.

After applied, the transparent coating layer-forming composition may be dried at a temperature of 30~70° C., preferably 50~60° C. If the temperature is lower than 30° C., the curing time is too long, and if the temperature exceeds 70° C., cracks generates on the anti-reflective layer. The curing time is preferably in the range of 1~15 minutes. If the curing time is shorter than 1 minute, the curing is incomplete, and if the curing time exceeds 15 minutes, the quality of lens deteriorates.

The transparent coating layer may have a thickness of 0.1~100 μm, preferably 0.1~10 μm. When the thickness is less than 0.1 μm, the coating layer is incompletely formed, and when the thickness exceeds 100 μm, the curing time is too long, thus lowering the productivity.

The lens having the inventive transparent coating layer as a temporary protective layer may be edged using a conventional edging apparatus. In the edging process, the inventive transparent coating layer can prevent lens off-centring phenomena due to its inherent elasticity and appropriate affinity to the surface of the lens. Further, the inventive transparent coating layer makes it possible to measure the diopter of lens exactly owing to its transparency; and it is manually removable without any etching or chemical treatment.

The present invention is illustrated in detail by the following Examples which are not intended to limit the scope of the invention.

Preparation:

Plastic lens having anti-reflective layer, water-repellant layer, and oil-repellant layer coated on the surface thereof.

On the surface of a plastic lens made of diethyleneglycol bisallylcarbonate polymer (refractive index: 1.499), a hard coating layer was formed using a silicon-based hard coating agent (MEXMER TE0801, a product of Gaematech). The hard coating layer was formed using a dipping method at a withdrawing speed of 15 cm/min, drying the resulting coating layer at room temperature for 1 minute, and curing at 80° C. for 2 minutes and then at 120° C. in a curing oven for 1.5 hours.

Thereafter, on the hard coating layer, anti-reflective layers comprised of silicone dioxide, zirconia and indium tin oxide (ITO) were formed by an e-beam evaporation method.

The hard coating layer/anti-reflective layer-coated lens thus obtained and a stainless steel filter (a mesh size of 80~100 microns, 18Φ×3 mm) impregnated with 2 ml of OPTOOL DSX (a product of Daikin) were placed in a vacuum deposition apparatus where a water-repellant layer and oil-repellant layer were deposited on the anti-reflective layer by a thermal evaporation method.

Example 1

Formation of Transparent Coating Layer 1

On the surface of the plastic lens obtained in Preparation, a 10 wt % solution of Dyneon™ THV220A (as a fluorine group-containing elastomer; a copolymer of vinylidene fluoride, tetrafluoroethylene and hexafluoropropene, 3M) dissolved in methyl ethyl ketone was coated as a protective layer for the lens using a dipping method at a withdrawing speed of 15 cm/min, and the coated lens was dried at 50° C. for 5 minutes to form a lens-protective transparent coating layer having a thickness of 1.3 μm on the lens.

Example 2

Formation of Transparent Coating Layer 2

The procedure of Example 1 was repeated except for using 50 wt % aqueous dispersion of Dyneon™ THV340C (a copolymer of vinylidene fluoride, tetrafluoroethylene and hexafluoropropene, 3M) instead of the Dyneon™ THV220A solution to form a lens-protective transparent coating layer having a thickness of 50 μm on the lens.

Example 3

Formation of Transparent Coating Layer 3

The procedure of Example 1 was repeated except for using a 20 wt % solution of Viton™ A (a copolymer of vinylidene fluoride and hexafluoropropene, DuPont) dissolved in methyl ethyl ketone instead of the Dyneon™ TMHV220A solution to form a lens-protective transparent coating layer having a thickness of 18 μm on the lens.

Example 4

Formation of Transparent Coating Layer 4

To 10 g of heptadecafluoro-1,1,2,2-tetrahydrodecyl trimethoxysilane (SIH5841.5, Gelest) as a fluorine-containing organosilane, 0.1 g of 0.01 N HCl aqueous solution and then 989.9 g of isopropyl alcohol were added, and the resulting mixture was refluxed at 100° C. for 24 hours. After the completion of reaction, the reaction solution was cooled to room temperature, and distilled at 50° C. under a pressure of $10^{-1}$ mmHg to remove the residual solvent and water completely, to obtain 9 g of the desired product, which was added to 500 g of methyl ethyl ketone, and thereto was added 50 g of Dyneon™ THV220A (a copolymer of vinylidene fluoride, tetrafluoroethylene and hexafluoropropene, 3M) as a fluorine group-containing elastomer.

The resulting mixture was stirred for 1 hour to dissolve the components in the solvent completely, and then coated on the surface of the plastic lens obtained in Preparation, and thereafter, a 10 wt % solution of dissolved in methyl ethyl ketone was coated thereon as a protective layer for the lens using a dipping method at a withdrawing speed of 15 cm/min. The coated lens was dried at 50° C. for 10 minutes to form a lens-protective transparent coating layer having a thickness of 1.5 μm on the lens.

Example 5

Formation of Transparent Coating Layer 5

The procedure of Example 4 was repeated except for using SIT8175 (tridecafluoro-1,1,2,2-tetrahydrooctyl triethoxysilane, Gelest) to form a lens-protective transparent coating layer having a thickness of 1.8 μm on the lens.

Example 6

Formation of Transparent Coating Layer 6

10 g of SIT8175 (tridecafluoro-1,1,2,2-tetrahydrooctyl triethoxysilane, Gelest) as a fluorine-containing organosilane was added to 500 g of methyl ethyl ketone, and the resulting mixture was stirred for 30 minutes and 50 g of Dyneon™ THV220A (3M) as a fluorine group-containing elastomer was added thereto. The resulting mixture was stirred for 1 hour, and 5 g of Ancamine 2458 (a produce of Air Products) was added thereto. The resulting mixture was stirred for 1 hour. The resulting coating solution was coated on the surface of the plastic lens obtained in Preparation using a dipping method at a withdrawing speed of 15 cm/min, and the coated lens was dried at 50° C. for 10 minutes to form a lens-protective transparent coating layer having a thickness of 2.0 μm on the lens.

Evaluation of Properties of Transparent Coating Layer

The lenses having the transparent coating layer for the protection thereof according to the present invention (Examples 1 to 6), the plastic lens before the formation of the transparent coating layer according to Preparation (Comparative Example 1), and the plastic lens to which a silicon-based adhesive film is attached (Comparative Example 2) were evaluated for various properties as described below, and the evaluation results are represented in Table 1.

(1) Light Transmittance

The light transmittances of the lens before and after coating with the transparent coating layer-forming composition according to the present invention at the visible light wavelength were determined using an apparatus for measuring the light transmittance (Haze Guide Plus, BYK Guidener).

(2) Diopter

The diopters of the lens before and after coating with the transparent coating layer-forming composition according to the present invention were measured with a dioptometer (CLM3100P, Huvitz), to observe the change of lens diopter values depending on the formation of the transparent coating layer.

(3) Off-Centring

For a lens for astigmatism, the axis of the lens was defined as astigmatism-correction axis, and for a lens for non-astigmatism, the lens axis was defined as the optical central line, and a frame having a high aspect ratio was used as a base frame.

After the lenses were edged with an edging apparatus (TOPCON ALE5000), they were mounted on the base frame to observe the off-centring degree of the astigmatism-correction axis or the angle of the optical central line to the horizontal line passing through the optical axis of the base frame, with a lensmeter.

30 lenses were edged and the percentages of lens having off-centered axis (when the off-centring degree is greater than acceptable ±2° deviation) was reported.

(4) Residue

In order to observe the presence of residue on the surface of lens, the lens after peeled the transparent coating layer therefrom by hands was tested with a contact angle tester (KSV Instrument CAM 100) to measure the change of the contact angle of the lens to water.

(5) Surface Energy

After forming the transparent coating layer on the lenses, the contact angles of the lenses to water, glycerol or diiodomethane were measured with a contact angle tester (DSA100, Kruss). The surface energy of the lens was determined by Owens-Wendt method using a drop shape analysis program (see "Estimation of the surface force energy of polymers" Owens D. K., et al., *J. Appl. Polym. Sci.* 13, 1741~1747 (1969)).

The evaluation results are represented in Tables 1 and 2.

TABLE 1

|  |  | Example 1 | Example 2 | Example 3 | Example 4 | Example 5 | Example 6 | Comp. Example 1 | Comp. Example 2 |
|---|---|---|---|---|---|---|---|---|---|
| Light Transmittance (%) | Before coating | 98 | 98 | 98 | 98.5 | 98.5 | 98.6 | 98.4 | 98.4 |
|  | After coating | 93 | 92 | 91 | 94.6 | 94.5 | 94.2 | — | — |
| Lens Diopter (for myopia/ astigmatism) | Before coating | −2.00/ −1.25 | −2.00/ −1.25 | −2.00/ −1.25 | −2.00/ −1.25 | −2.00/ −1.25 | −2.00/ −1.25 | −2.00/ −1.25 | −2.00/ −1.25 |
|  | After coating | −2.00/ −1.25 | −2.00/ −1.25 | −2.00/ −1.25 | −2.00/ −1.25 | −2.00/ −1.25 | −2.00/ −1.25 | — | — |
| Off-centring (%) |  | 0 | 0 | 0 | 0 | 0 | 0 | 95 | 15 |

TABLE 1-continued

|  |  | Example 1 | Example 2 | Example 3 | Example 4 | Example 5 | Example 6 | Comp. Example 1 | Comp. Example 2 |
|---|---|---|---|---|---|---|---|---|---|
| Residue (Contact Angle)(°) | Before coating | 112° | 111° | 113° | 115.1° | 113.9° | 114.8° | 115.4° | 115.2° |
|  | After peeling | 112° | 111° | 113° | 115.0° | 114.2° | 114.6° | — | 110.8° |

TABLE 2

|  |  | Example 1 | Example 2 | Example 3 | Comp. Example 1 |
|---|---|---|---|---|---|
| Contact Angle (°) | Water | 109.0 | 107.9 | 109.2 | 115.4 |
|  | Glycerol | 108.4 | 105.1 | 103.1 | 111.2 |
|  | Diiodomethane | 93.1 | 92.5 | 88.8 | 99.4 |
| Surface Energy (mJ/m$^2$) |  | 11.14 | 11.89 | 13.39 | 9.01 |

As can be seen from Tables 1 and 2, when a lens is edged after coating of a transparent protective layer according to the present invention, the scratch of lens during handling, the contamination of lens by chemicals or impurities, off centring during edging process and troubles caused by using adhesive tape or pad can be prevented. Further, in accordance with the present invention, since the temporary protective layer is transparent, the lens is easy to measure its diopter. Furthermore, the inventive temporary protective layer can be easily removed by hands without a separate treatment.

While the invention has been described with respect to the above specific embodiments, it should be recognized that various modifications and changes may be made and also fall within the scope of the invention as defined by the claims that follow.

What is claimed is:

1. A process for edging a lens having an outer water-repellent layer, the process comprising forming a lens-protective transparent coating layer on the surface of the outer water-repellant layer of the lens, edging the coated lens, and removing the lens-protective transparent coating layer from the edged lens, wherein the lens-protective transparent coating layer comprises a fluorine-containing elastomer and has a surface energy of less than 15 mJ/m$^2$.

2. The process of claim 1, wherein the fluorine-containing elastomer is a homopolymer or copolymer of at least one monomer selected from the group consisting of chlorotrifluoroethylene, hexafluoropropylene, hexafluoroacetone, 1-hydropentafluoropropylene, perfluorovinyl ether, perfluoromethylvinyl ether, trifluoroethylene, tetrafluoroethylene, and vinylidene fluoride.

3. The process of claim 2, wherein the fluorine-containing elastomer in the form of a copolymer is copolymerized with at least one comonomer selected from ethylene and propylene.

4. The process of claim 1, wherein the lens-protective transparent coating layer further comprises a fluorine-containing organosilane compound.

5. The process of claim 4, wherein the fluorine-containing organosilane compound is selected from the compounds of formulas (1) to (5):

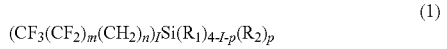

(1)

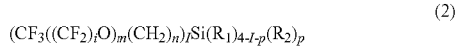

(2)

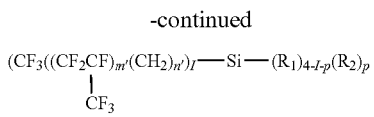

(3)

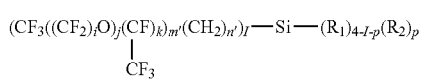

(4)

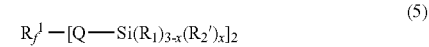

(5)

wherein,
$R_1$ is a hydrolyzable group;
$R_2$ is hydrogen or $C_{1-4}$ alkyl;
$R_2'$ is $C_{1-4}$ alkyl;
$R_f^1$ is a monovalent or divalent polyfluoropolyether group;
Q is an organic divalent bridging group;
i, j, k, m and n are each independently an integer in the range of 0 to 13;
m' is an integer in the range of 1 to 13;
n' is an integer in the range of 0 to 3;
p is an integer in the range of 0 to 3;
l is 1 or 2; and
x is 0 or 1.

6. The process of claim 4, wherein the lens-protective transparent coating layer is formed by applying on the lens a composition comprising 1 to 70% by weight of a fluorine-containing elastomer, 0.001 to 70% by weight of a fluorine-containing organosilane compound based on the elastomer, and a balancing amount of a solvent, and drying the applied composition.

7. The process of claim 6, wherein the lens-protective transparent coating layer is formed by applying on the lens a composition comprising 10 to 40% by weight of a fluorine-containing elastomer, 0.001 to 30% by weight of a fluorine-containing organosilane compound based on the elastomer, and a balancing amount of a solvent, and drying the applied composition.

8. The process of claim 1, wherein the lens-protective transparent coating layer has a thickness of 0.1-100 μm.

9. The process of claim 1, wherein the lens-protective transparent coating layer has a surface energy of 11 to 14 mJ/m$^2$.

10. The process of claim 1, wherein the lens-protective transparent coating layer is manually removable without the use of a chemical.

11. A lens for edging comprising an outer water-repellant layer and a lens-protective removable transparent coating layer on the outer water-repellant layer, wherein the lens-protective transparent coating layer comprises a fluorine-containing elastomer and has a surface energy of less than 15 mJ/m$^2$.

12. The process of claim 1, wherein the fluorine-containing elastomer is a homopolymer or copolymer of hexafluoropropylene, perfluorovinyl ether, tetrafluoroethylene, and vinylidene fluoride.

13. The process of claim 1, wherein the fluorine-containing elastomer is a homopolymer or a copolymer of hexafluoropropylene, tetrafluoroethylene, and vinylidene fluoride.

14. The lens of claim 11, wherein the lens-protective transparent coating layer has a surface energy of 11 to 14 mJ/m$^2$.

15. The lens of claim 11, wherein the fluorine-containing elastomer is a homopolymer or copolymer of at least one monomer selected from the group consisting of chlorotrifluoroethylene, hexafluoropropylene, hexafluoroacetone, 1-hydropentafluoropropylene, perfluorovinyl ether, perfluoromethylvinyl ether, trifluoroethylene, tetrafluoroethylene, and vinylidene fluoride.

16. The lens of claim 11, wherein the lens-protective transparent coating layer further comprises a fluorine-containing organosilane compound.

17. The process of claim 2, wherein the fluorine-containing elastomer is a copolymer.

18. The process of claim 1, wherein the fluorine-containing elastomer is a homopolymer or copolymer of at least one monomer selected from the group consisting of hexafluoropropylene, tetrafluoroethylene and vinylidene fluoride.

19. The process of claim 1, wherein the fluorine-containing elastomer is a copolymer of hexafluoropropylene, tetrafluoroethylene and vinylidene fluoride.

20. The process of claim 1, wherein the fluorine-containing elastomer is a copolymer of hexafluoropropylene and vinylidene fluoride.

21. The process of claim 1, wherein the outer water-repellent layer comprises a fluorine-containing or perfluoropolyether-containing organosilane compound.

22. The lens of claim 11, wherein the fluorine-containing elastomer is a copolymer of hexafluoropropylene, tetrafluoroethylene and vinylidene fluoride.

23. The lens of claim 11, wherein the fluorine-containing elastomer is a copolymer of hexafluoropropylene and vinylidene fluoride.

24. The lens of claim 11, wherein the water-repellent layer comprises a fluorine-containing or perfluoropolyether-containing organosilane compound.

* * * * *